(12) United States Patent
Karthikeyan et al.

(10) Patent No.: US 10,075,390 B2
(45) Date of Patent: Sep. 11, 2018

(54) COMMUNICATIONS NETWORK USING A TUNNEL TO CONNECT TWO NETWORK NODES

(71) Applicant: BRITISH TELECOMMUNICATIONS PUBLIC LIMITED COMPANY, London (GB)

(72) Inventors: Vidhyalakshmi Karthikeyan, London (GB); Detlef Daniel Nauck, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 0 days.

(21) Appl. No.: 14/439,812

(22) PCT Filed: Oct. 31, 2013

(86) PCT No.: PCT/GB2013/000466
§ 371 (c)(1),
(2) Date: Apr. 30, 2015

(87) PCT Pub. No.: WO2014/068270
PCT Pub. Date: May 8, 2014

(65) Prior Publication Data
US 2015/0295855 A1    Oct. 15, 2015

(30) Foreign Application Priority Data
Oct. 31, 2012  (EP) .................................... 12250167

(51) Int. Cl.
*H04L 12/28*     (2006.01)
*H04J 3/00*      (2006.01)
(Continued)

(52) U.S. Cl.
CPC ........ *H04L 47/825* (2013.01); *H04L 43/0876* (2013.01); *H04L 47/70* (2013.01);
(Continued)

(58) Field of Classification Search
CPC ..... H04L 49/205; H04L 49/25; H04L 47/825; H04L 47/22; H04L 47/726
See application file for complete search history.

(56) References Cited

U.S. PATENT DOCUMENTS 6,728,239 B1   4/2004  Kung et al.
6,931,109 B1   8/2005  Cook
(Continued)

FOREIGN PATENT DOCUMENTS

EP         1 383 285       1/2004
WO     WO 2011/076737      6/2011

OTHER PUBLICATIONS

International Search Report for PCT/GB2013/000466 dated Nov. 26, 2013, 3 pages.
(Continued)

*Primary Examiner* — Faruk Hamza
*Assistant Examiner* — Abu-Sayeed Haque
(74) *Attorney, Agent, or Firm* — Nixon & Vanderhye P.C.

(57) ABSTRACT

A session admission process is provided which identifies the weakest link in a route between a first node and a second node and determines if the route is able to cope if the session is admitted. The suitability of a link is determined on the basis of: historical link performance; the predicted future performance of the link; and the predicted future demands on the link from other sessions supported by that link.

18 Claims, 6 Drawing Sheets

(51) Int. Cl.
*G06F 15/177* (2006.01)
*H04L 12/911* (2013.01)
*H04L 29/06* (2006.01)
*H04L 12/26* (2006.01)

(52) U.S. Cl.
CPC ...... *H04L 65/1006* (2013.01); *H04L 65/1009* (2013.01); *H04L 65/80* (2013.01)

(56) References Cited

U.S. PATENT DOCUMENTS

| | | | |
|---|---|---|---|
| 7,490,169 B1 | 2/2009 | Ogdon et al. | |
| 8,223,711 B1 | 7/2012 | Khanka | |
| 2004/0165528 A1* | 8/2004 | Li | H04L 12/4641 370/230 |
| 2005/0088963 A1* | 4/2005 | Phelps | H04J 3/14 370/216 |
| 2005/0147041 A1* | 7/2005 | Zaki | H04L 47/14 370/235 |
| 2008/0052393 A1* | 2/2008 | McNaughton | H04L 41/147 709/224 |
| 2009/0285093 A1 | 11/2009 | Bolt | |
| 2009/0313374 A1* | 12/2009 | Murphy | H04L 67/2847 709/226 |
| 2010/0036953 A1 | 2/2010 | Bogovic et al. | |
| 2010/0195535 A1* | 8/2010 | Ziller | H04L 45/123 370/254 |
| 2011/0063976 A1* | 3/2011 | Birk | H04L 43/0888 370/235 |
| 2012/0321052 A1 | 12/2012 | Morrill | |
| 2012/0330804 A1* | 12/2012 | Morrill | H04M 15/00 705/34 |

OTHER PUBLICATIONS

"Centralized RACF architecture for MPLS core networks", Y.2175, ITU-T Standard, International Telecommunication Union, Geneva, CH, No. Y.2175, Nov. 13, 2008 (26 pages).
Karthikeyan et al. Office Action (11 pages) dated Jun. 17, 2016, issued in copending U.S. Appl. No. 14/389,554, filed Sep. 30, 2014.
Karthikeyan et al. copending U.S. Appl. No. 14/389,554, filed Sep. 30, 2014 (23 pages).
International Search Report for PCT/GB2013/000142, dated May 29, 2013 (3 pages).

* cited by examiner

COMMUNICATIONS NETWORK USING A TUNNEL TO CONNECT TWO NETWORK NODES

This application is the U.S. national phase of International Application No. PCT/GB2013/000466 filed 31 Oct. 2013, which designated the U.S. and claims priority to EP 12250167.9 filed 31 Oct. 2012, the entire content of each of which are hereby incorporated by reference.

BACKGROUND AND SUMMARY

The present invention, relates to a method of operating a communications network, and in particular to a method of controlling the admission of sessions into and across a communications network.

Call or session admission requests are made using component protocols, for example the Session Initiation Protocol (SIP) or a protocol from the H.323 protocol suite, although it would be understood that other protocols are known. H.323, in a Voice over IP (VoIP) example, uses H.225.0 to make an admission request (ARQ), with protocol H.245 being used to negotiate audio parameters that will be used in the sessions. Even if a proprietary protocol is being used, such a request will contain information about the supported and desired Quality of Service parameters—a function of, for example, bandwidth (B) required at bitrate $r_b$, maximum loss supportable for service $I_m$ maximum tolerable delay $t_d$ and jitter $t_j$. This admission request can be expressed in a generalised form as;

$$ARQ = f(B, r_b, I_m, t_d, t_j)$$

This request can be translated into one of many predefined 6-bit DSCP (Differentiated Services Code Point) values used in IP/MPLS data packets either at the source of the data, that is within a customer's network or at the Provider Edge (PE) of the network. There are several label distribution protocols that can be used to create and make bindings of labels to forwarding equivalence classes (FEC) in MPLS networks. Examples include BGP (Border Gateway Protocol), RSVP-TE (Resource Reservation Protocol-Traffic Engineering), LDP (Label Distribution Protocol) and TDP (Tag Distribution Protocol). The following discussion will focus on the use of RSVP-TE in this IRF but the principles of the present invention have broader relevance than the message carrying protocols used in a particular embodiment.

FIG. 1 shows a schematic depiction of a conventional MPLS network 100. The MPLS network 100 connects a first customer network 200a to a second customer network 200b. The first customer network 200a comprises a provider edge router 210a which is in communication with a first MPLS network provider edge router 110a.

Similarly, the second customer network 200b comprises a provider edge router 210b which is in communication with a second MPLS network provider edge router 110b. The MPLS network 100 further comprises a plurality of provider routers 120 which provide a plurality of routes through the MPLS network from the first MPLS network provider edge router 110a to the second MPLS network provider edge router 110b. In one implementation of MPLS, the ingress provider edge router defines the path that an MPLS-enabled session must take to reach the egress provider edge router. This is called explicit routing, which can be strict or loose. The intelligence is therefore pushed to the provider edge routers in MPLS, where they classify, encapsulate, route and decapsulate sessions using stacked label switching whereas the provider routers (that is a router which act only as a transit router within a network) will only perform label switching.

FIG. 1 further shows an MPLS tunnel which connects the first and second MPLS network provider edge routers 110a, 110b. Once an MPLS tunnel has been created, it will only be used for traffic forwarding by the Interior Gateway Protocols (IGPs) if this is programmed after tunnel setup. When an admission request arrives at a Provider Edge router, admission is granted or denied based on availability of resources, usually availability of bandwidth for the required bitrate, in the network for that session using the DSCP value (which will correspond to the QoS that the service requests). If the MPLS tunnels have been advertised to the Interior Gateway Protocol (IGP) then they can be used for routing the admitted traffic trunk if they meet its QoS requirements. The mapping of the route of the tunnel to the hardware below can change during the course of the session due to changes in the IGP. This is used for temporary resilience in the event of link or router failure and is called Fast Re-Route (FRR). Examples of IGPs are Open Shortest Path First (OSPF), Intermediate System to Intermediate System (IS-IS) and Routing Information Protocol (RIP). OSPF and IS-IS are link state protocols, which means that each node that uses this protocol has a knowledge of the entire topology and link costs of its local network. This property is later used in this IRF.

Bashar et al, "Machine Learning Based Call Admission Control Approaches: A Comparative Study" discloses a technique of estimating the current value of a network parameter that is difficult to measure based on the current measurement of other network parameters based on historical variations of the different parameters.

According to a first aspect of the present invention there is provided a method of operating a communications network, the network comprising a plurality of nodes, a plurality of communications links interconnecting the nodes and a plurality of tunnels, each of the plurality of tunnels comprising one or more of the plurality of communications links, the method comprising the steps of: a) creating a datastore, the datastore comprising, for each of the plurality of tunnels connecting a first network node to a second network node, one or more parameter values for a plurality of time intervals over a pre-determined duration; b) receiving a request to admit a session to the communications network, the session being routed between the first network node and the second network node; for each of the plurality of tunnels connecting a first network node to a second network node: i) determining the expected performance of he tunnel for the duration of the requested session; ii) determining the impact of admitting the requested session to the sessions already supported by the tunnel; and iii) evaluating the historical performance of the tunnel; and accepting the request to admit a session to one of the plurality of tunnels if the admitted session can be supported by the tunnel throughout the duration of the session without impacting presently supported sessions.

The method may comprise the further step of updating the datastore in response to the acceptance of the request to admit a session. During step a) the datastore may be created on the basis of parameter values of the plurality of communications links which comprise the plurality of tunnels.

During step i) the expected performance of the tunnel for the duration of the requested session may be determined on the basis of one of the communications links which comprise the tunnel; this determination may be made on the basis of the communications links which is most likely to fail in the event that the session is admitted.

If the requested session cannot be admitted by the network, then the method may comprise the further steps of: determining a first portion of the requested session to be admitted over a first tunnel connecting a first network node to a second network node; determining one or more further portions to be admitted over one or more further tunnels connecting a first network node to a second network node, the admission of each of the portions of the session request to be determined in accordance with steps i), ii) & iii).

According to a second aspect of the present invention there is provided a network gatekeeper for a network comprising a plurality of nodes, a plurality of communications links interconnecting the nodes and a plurality of tunnels, each of the plurality of tunnels comprising one or more of the plurality of communications links, the gatekeeper being configured, in use, to a) create a datastore, the datastore comprising, for each of the plurality of tunnels connecting a first network node to a second network node, one or more parameter values for a plurality of time intervals over a pre-determined duration; b) receive a request to admit a session to the communications network, the session being routed between the first network node and the second network node; and, for each of the plurality of tunnels connecting a first network node to a second network node, to: i) determine the expected performance of the tunnel for the duration of the requested session; ii) determine the impact of admitting the requested session to the sessions already supported by the tunnel; and iii) evaluate the historical performance of the tunnel; and accept the request to admit a session to one of the plurality of tunnels if the admitted session can be supported by the tunnel throughout the duration of the session without impacting presently supported sessions.

The network gatekeeper may be further configured to, if the requested session cannot be admitted by the network: determine a first portion of the requested session to be admitted over a first tunnel connecting a first network node to a second network node; determine one or more further portions to be admitted over one or more further tunnels connecting a first network node to a second network node, the admission of each of the portions of the session request to be determined in accordance with steps i), ii) & iii).

BRIEF DESCRIPTION OF THE DRAWINGS

Embodiments of the present invention will now be described, by way of example only, with reference to the accompanying drawings in which.

DETAILED DESCRIPTION OF EXAMPLE EMBODIMENTS

Figure 1:
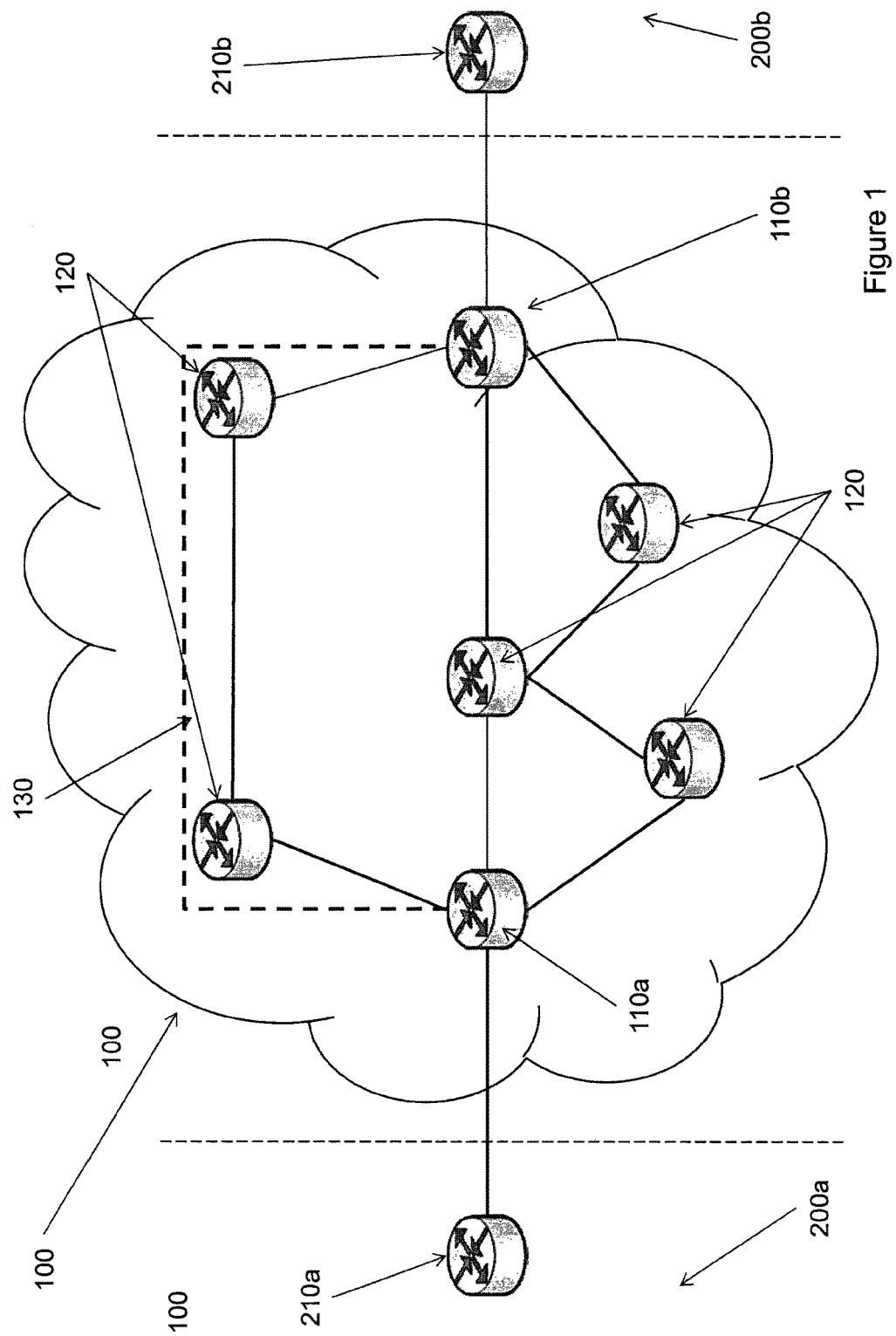
FIG. 1 shows a schematic depiction of a conventional MPLS network.

The present invention requires the application of several predictive models in order to predict network performance or related parameters. Predictive models can be built from historical data and can then be used to predict certain variables used in making decisions about traffic admission, routing or load balancing. There are several data sources used to build predictive network models:

1. OSPF Type 10 Link State Advertisements (LSAs) that provide information about the maximum, reservable and unreserved bandwidth on the links that send this update. These are extensions proposed for OSPF to support MPLS TE.

2. Link failure predictions, for example as described in WO2011/117570

3. Management Information Base (MIB) parameters polled regularly and collected using an existing protocol (for example the Simple Network Management Protocol). Examples of parameters collected include, without limitation:

TABLE 1

Exemplary Management Information Base (MIB) parameters

| Object | Description |
|---|---|
| ifSpeed | An estimate of the interface's current data rate capacity |
| ipInReceives | Number of IP datagrams received from the interface including received in error. |
| ipInDiscards | Number of IP datagrams for which no problems were encountered to prevent their continued processing but they were discarded |
| ipOutDiscards | Number of IP datagram for which no errors were encountered to prevent their continued processing but were discarded (e.g. buffer full) |
| ipReamsOKs | Number of datagrams successfully reassembled |
| ipReamsFails | Number of failure detected by the reassembly software |

4. Rate of change of Explicit Congestion Notification (ECN) flags for services in classes of services that use them (e.g. Assured Forwarding)

5. Bandwidth threshold at which Weighted Random Early Detection (WRED) is triggered for the Assured Forwarding classes of service 6. Forecasts about predicted incoming content/sessions based on personal recommendations, subscription information and other user details (for example as disclosed in GB2011/001773)

7. Local performance predictions per link (such as those disclosed in GB2011/001733)

8. Historical performance of a link for a given class of service.

The above metrics are used to create a per DCSP value model of each network entity, either at an interface or router level. Such a model may be created by:

i) Determining, based on the interface speed of a router held in the MIB, whether the desired data rate can be supported over the link when no other service is being carried on the link.

ii) Predicting the performance (for example throughput, loss, jitter, delay etc.), for a link against a local service level agreement (SLA) for each class of service supported by the link. The MIB parameters relating to packet discards due to congestion or protocol errors, ingress/egress buffer and link occupancy, rate of incoming packets, rate of transmitted packets can be used to predict (for example, using a time series analysis), the predicted performance. Similarly, if the rate of change of ECN notifications per traffic trunk is positive, congestion is increasing. If the rate of change increases, congestion will be building up more rapidly. Building a time series forecast is one technique to make such predictions (such as that disclosed in GB2011/001733)

iii) The arrival of new traffic into the network can be predicted, which enables a network element (such as a link or a router) to be configured to provide a given bandwidth of packets at a pre-determined class of service at a certain time in the future using mechanisms, such as those proposed in GB2011/001773.

iv) The maximum reservable bandwidth as a proportion of the reserved bandwidth from the OSPF LSAs, in conjunction with performance predictions about existing services, is used to determine whether there is enough room to accommodate more sessions. User and content metadata can be analysed to determine how long existing and expected sessions are expected to traverse the network. This affects the tunnel paths at a certain time for new sessions admitted into the network.

v) Predictions of new traffic can also be used with an incoming session request to potentially reject an incoming session in order to admit another of a higher class of service, which is expected to arrive within a short interval. One policy could dictate that a long AF4 (Assured Forwarding 4) session is turned down in preference to an expected short Expedited Forwarding (EF) session at a scheduled time later than the arrival of the AF4-marked session, if the impact of the AF4-marked session would deteriorate the QoS of the EF-marked session. Other operator policies can also be implemented.

vi) Any links with failures predicted from other link failures or time of day (see the applicant's co-pending application WO2011/117570) or a Planned Engineering Work (PEW)/Major Service Outage (MSO) list are removed from being used in the MPLS tunnels prior to the time when the failure is predicted to happen. This is to make sure that these routes are not mapped to MPLS labels or used in resource reservation when they may fail during the session itself. The expected duration of the session, if available from user history metrics, subscription information, TV schedules etc., can be used to exclude a failing link from being used in the MPLS tunnel.

vii). A regression model can be built to calculate the impact of admitting a service into the network based on current and expected performance of the as-is situation, in conjunction with the load and per class of service performance required by the new session.

viii) Before assigning a tunnel to a link and then to a DSCP value, the performance of the link in historical data for the same class of service at a similar load can be used to determine whether a link will perform as expected once a given session has been admitted. If a prediction indicates that a given link is capable of supporting a given session at a specified class of service (based on any or all of the above and the RSVP protocol PATH or RESERVATION messages) but its past performance indicates otherwise with a high confidence, this link is not appended to the tunnel that carries that session. Such an assessment may be made on the basis of rule mining, for example e.g. association rule mining, of the performance of a link appended to an MPLS label in historical data (as described in GB2011/001733).

The result of such an analysis is a decision engine using a number of time-dependent models per router, or per interface, for each class of service. The models can be created by several possible machine learning methods (e.g. Bayesian network, neural network, decision tree, time series prediction, regression, etc.) or by explicit knowledge representation (e.g. rule base). If a Bayesian network is used then each variable or attribute required for making a decision will be represented as a node in the Bayesian network. Each node provides a probability distribution for the possible values of the respective variable, or decision point, it represents. For example, one of the nodes could indicate the likelihood of satisfying a certain class of service request given all the other predictions, impact calculations and past performance. It is also possible to calculate, given that a session is admitted, the expected QoS parameters for all the other sessions. There are well known learning algorithms that can generate a Bayesian network from data (see, for example, D. Heckerman, 'A Tutorial on Learning with Bayesian Networks' from "Learning in Graphical Models", M. Jordan, ed. MIT Press, Cambridge, Mass., 1999).

The data required for the learning algorithm is historic network performance data that records values for each required decision variable. The principle is the same for other machine learning models. However, a Bayesian network has the advantage that all its variables can function both as input and output variables. Other machine learning models like neural networks, decision trees or regression models distinguish between input and output variables: for each decision variable a separate model has to be built, whilst in the case of a Bayesian network a single model is sufficient. The type of model to be used will depend upon the preferences of a network operator in relation to computational requirements, available training data and model accuracy.

Assume that a predictive model is required that is able to predict average jitter J, loss L and delay D for a given link L1 over the next four hours with a granularity of one hour. The most simple prediction model would be to maintain hourly statistics for jitter, loss and delay over a 24-hour period and update these values continuously from the most recent measurements. A prediction would then simply select the average values from the time window of interest in, i.e. if the values from 13.00-17.00 hours are required then these four hourly values are selected from the 24 hour statistics that are held.

The statistics can be built by averaging measurements over a certain number of days, for example 14, so that, for example the average jitter can be expressed as:

$$J_t = \Sigma_{j=d-14}^{d} J_t^{(j)},$$

where: d is today; $J_t^{(d)}$ is the Jitter on day d at hour t, t=0, ..., 23; and $J_t$ is the prediction for jitter at the next occurrence of hour t (i.e. this model will predict a maximum of 23 hours in advance). Such a model can easily be extended to take different days of the week into account. The number of days over which historical data is collected can also be changed to take into account the dynamics of the network traffic.

A more complex predictive model would take other factors than just the past value of the target variable into account. For example, statistics for jitter, delay, loss, throughput, number and types of sessions, time of day etc., could be collected and one of these variables, e.g. jitter, could be used as the target for prediction and the other variables as inputs for a predictive model. The predictive model is then a function $f$, which can be implemented, for example, by a neural network. Assume that a neural network is trained to predict the jitter at a particular hour of the day t, e.g.

$$J_t = f(t, t', J', D', L')$$

where J', D', L' are average jitter, delay and loss, respectively, for the one hour long time window ending at the full hour t'. By monitoring the average hourly values of these variables for a number of days a training data set can be constructed which can be used to train a neural network which will implement the function $f$. The number of variables used as an input for the function $f$ can be extended if it is found that the prediction of jitter requires more information from the network. It is also straightforward to construct other functions from the same training data that predict other variables, such as delay, loss, etc. The granularity of the function can be varied by changing the length of the time window used for averaging and predicting the variable values. The day of the week may be included as an additional input variable in order to take daily & weekly patterns into account.

In order to compute the prediction for jitter at 13.00 hours at time 10.00 hours $f$ is used to compute $$J_{13} = f(13, 10, 1.5 \text{ ms}, 17 \text{ ms}, 0.6\%)$$

assuming that the average values for jitter, delay and loss were measured as 1.5 ms, 17 ms and 0.6%, respectively, at 10.00 hours.

Figure 2:
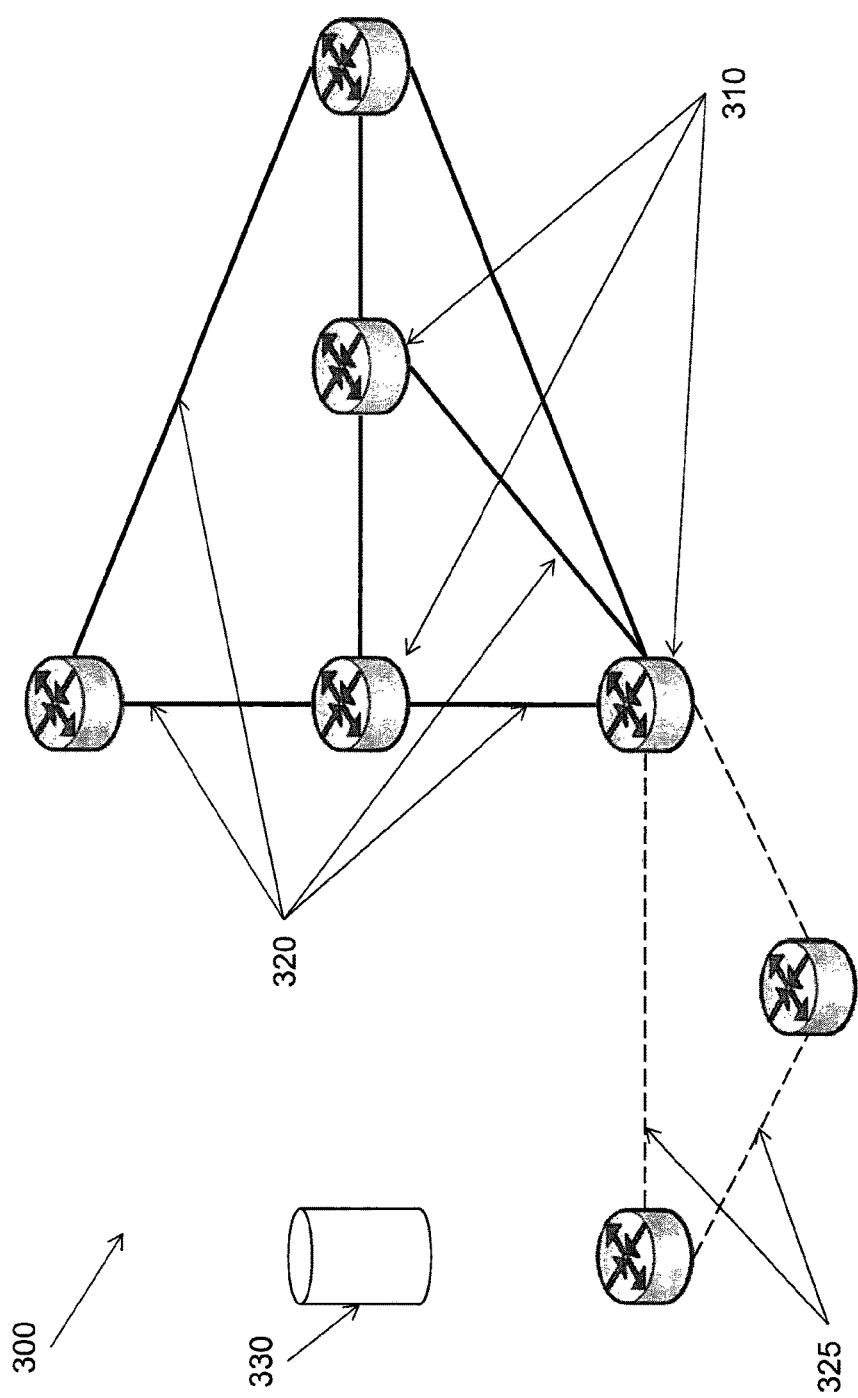
FIG. 2 shows a schematic depiction of a local network which comprises a plurality of interconnected routers and network gatekeeper.
Figure 3:
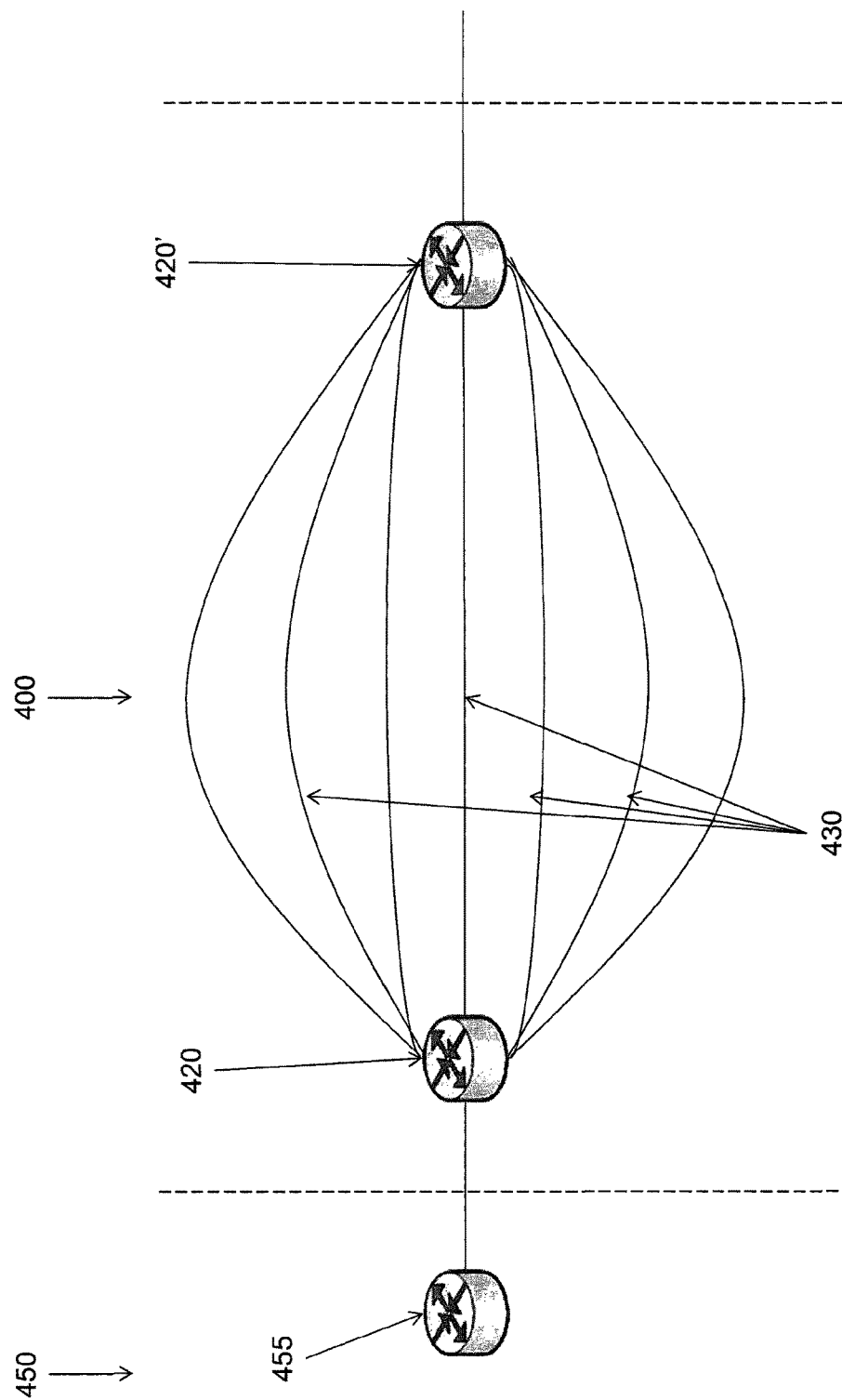
FIG. 3 shows a schematic depiction of a further network configuration in which such a gatekeeper can be implemented.
Figure 4:
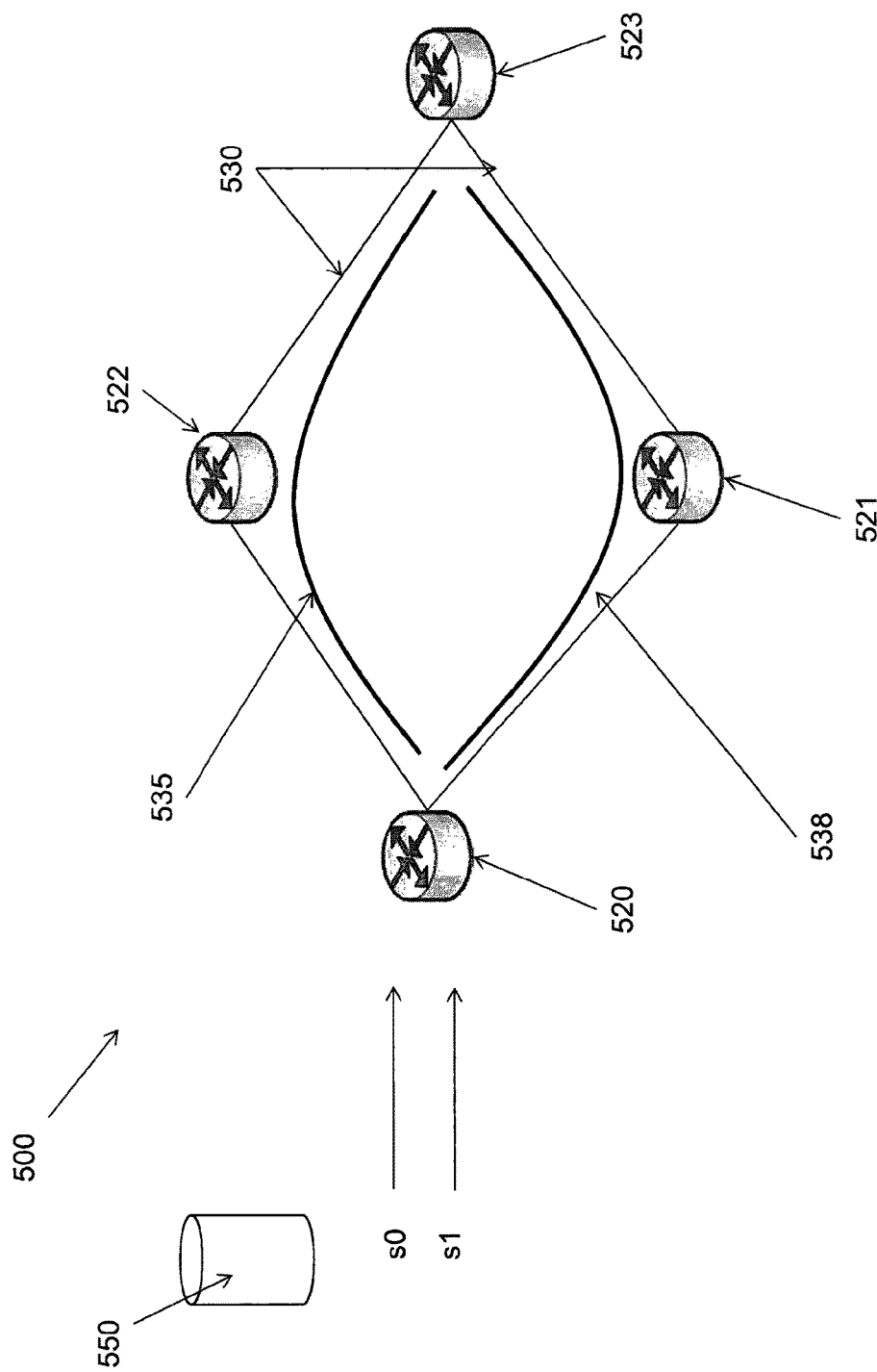
FIG. 4 shows a schematic depiction of a network comprising four routers, each of which is interconnected by network links.

FIG. 2 shows a schematic depiction of a local network 300 which comprises a plurality of interconnected routers 310 and network gatekeeper 330. The routers are in communication with the gatekeeper 330 over management communication links (not shown). The local network comprises a plurality of links 320 which support IP traffic as well as a number of pre-configured MPLS tunnels and a plurality of IP-based links which do not also support MPLS. The MPLS links are shown in a solid line and the IP-only links are shown with a dashed line in FIG. 2. Any link updates from these links 320, 325 will be flooded to all the others in this local segment using, for example, Type 10 OSPF Link State Advertisements (LSAs). The network gatekeeper selectively advertises MPLS tunnels to the IGP. The purpose of this gatekeeper is to use the predictive models built for the tunnels under its control to perform better traffic management than a first-come-first-served approach which could be taken when advertising MPLS routes directly to the IGP. The operation of the gatekeeper will be described in greater detail below. Instead of providing a centralised gatekeeper it will be understood that it is possible to implement the gatekeeper function at one or more, or each, of the PE routers of the MPLS network FIG. 3 shows a schematic depiction of a further network configuration in which such a gatekeeper can be implemented. Customer network 450 is connected to MPLS network 400 with traffic being routed from a customer network router 455 to a first MPLS network router 420. The first MPLS network router is connected to a second MPLS network router 420' via a plurality of MPLS tunnels 430. Traffic received from the customer network at the first MPLS network router 420 will be processed in accordance with local policies and agreed SLAs. By implementing the gatekeeper function within the first MPLS network router it is possible to provide the required QoS for the traffic from the customer network without needing to expose or advertise the capabilities of the MPLS tunnels. Selected MPLS routes will be advertised to the Exterior Gateway Protocol by the first MPLS network router. In operation the network gatekeeper (the following description is equally applicable to the gatekeeper function that may be implemented within a router) will generate a Capability Look-up Table (CLT), the derivation of which will be described below.

When a routing request is made to use an MPLS tunnel, for example from a session using SIP, H.323 or similar, the following actions are taken based on the capability look up table:

When a request is made to the network, the gatekeeper function determines whether or not to admit the service at the requested class of service. This decision is made by using the decision process described below based on parameters such as predicted impact, availability of resources to support the QoS requirement specified in the session request, expected performance of existing sessions, predictions of other incoming content etc. The corresponding H.323/SIP messages are sent back according to the decision made.

The first step on the decision process for the admission of session s0 (the output of each step will be used in the subsequent step, along with other inputs):

I. Identification of weakest link in shortest path
  a. Inputs: a) call characteristics, e.g. expected duration of the session, destination, expected class of service, requested bandwidth, QoS parameters (jitter, loss, throughput, delay), protocols (TCP/UDP traffic); (b) routing tables calculated by routing algorithm (OSPF, for example), (c) real-time performance metrics (e.g. MIB parameters).
  b. Based on destination, CoS etc., pick the shortest route to destination.
  c. Identify bottleneck link in chosen shortest path based on performance metrics.

II. Calculation of expected performance at time t+1 for chosen link (may not be using the same performance metrics as (iii) above.
  a. Inputs from bottleneck link chosen: predicted link downs, planned engineering works and scheduled link down events, current MIB metrics, rate of change of ECN markings in current packets, OSPF LSA Type 10 metrics (and simple functions of these, e.g. available link capacity calculated as a ratio of unreserved to reserved bandwidths—the smaller this value, less room for growth of existing services).
  b. A function $P=f\{L, a, b, c, d\}$, where $\{a, b, c, d\}$ are example metrics chosen from the above inputs, is derived to predict the performance of chosen bottleneck link L at time t+1 where t+1 is longer than the expected duration of the session. Function P can be a number of machine learning techniques, e.g. a neural network. This timescale is to minimise the impact of any performance degradation on the admitted service itself, if this link is chosen at a later stage for the new traffic. If the admitted session is longer than the prediction period (or the expected duration is not known), it increases the risk that if degradation occurs on the bottleneck link, a re-route must be done during the session. The techniques proposed in GB2011/001733 can then be used to manage in-life service degradation.

III. Evaluation of impact
  a. Inputs: Expected performance at t+1, expected impact if admitted, expected traffic pattern in future for duration of session (from social recommendations etc. as described in GB2011/001773)
  b. The purpose of this step is to decide on the impact of performance of the chosen link L based on the link performance forecast from the previous section. The expected impact input could be a 'what-if' calculation of available bandwidth in the link after the admission of s0 It could be a delay calculation, taking into account the impact of s0 on the buffer scheduling algorithm. It could be a more complex model that evaluates a multi-dimensional QoS matrix if s0 is admitted.

c. If the expected performance of services already on the link is acceptable, the expected traffic pattern is such that no new services are to be carried on this link at higher priority (or using an operator specified network policy) and expected impact if admitted is admissible for the other services on this link, we proceed to the next stage.

IV. Evaluation against historical performance a. The purpose here is to check if this bottleneck link has performed as expected in previous times. For example, when a similar distribution of services of different CoS was observed on this link (with respect to allocated bandwidths for each CoS, total link occupancy etc.), were all the services supported successfully? Machine learning techniques like association rules can be used to determine this. If the outcome of this test is that the link has performed well in the past under similar conditions, the service is admitted into the network.

This call admission technique works very well if the network is not under high load and especially if the bottleneck link has unused capacity that exceeds the requirements of the session request. In this case, this admission control technique is quick in examining the bottleneck link of the shortest path using prediction models that have been periodically built and updated. Based on the thorough analysis of the bottleneck link, all other links in the path chosen can be assumed to perform better than the bottleneck link. This method above solution is a balanced trade-off between being lightweight and thorough.

The steps of creating a decision mechanism to evaluate a link (or similarly a tunnel, in the following discussion) using traffic characteristics of the link (or the links which comprise a tunnel), future expected performance of the link, expected impact if a session is admitted on the link (or tunnel) and evaluation against historical performance are key steps to the core prediction model.

In a network operating at high load, evaluating one link from the shortest path gives a quick decision mechanism but might result in rejecting calls because of the shortest route's bottleneck link. In such a case, further traffic engineering can be added once a call admission decision is performed. Alternatively, call admission can be performed after a suitable route has been found, although this route may not be the shortest path.

A method may be used which enables the selection of a number of potential routes from a plurality of candidate routes to a given destination. This method can also be incorporated with session admission such that a session is only admitted if there is at least one route that can be used to take all the required traffic to the destination. This approach is more laborious as the analysis must be extended to several tunnels, rather than just a single link. Using this technique, call admission could take longer but better traffic management will be provided during high network loads. MPLS TE has traditionally been static, with routes for customers and the marking of DSCP values being predetermined. The present invention provides a dynamic way of allocating available tunnels to incoming trunk traffic requests that also uses the above-described core predictive model.

The capability look up table is used to choose one or more tunnels on a policy and availability basis. It maintains a list of tunnels available over time for bins of service requests to geographical regions (either individual IP addresses or a PE router at the egress node from which simple IP can be used). For example, one of the bins could be bandwidth requirement for a given class of service. The capability tunnel may also adjust bin sizes over time.

The gatekeeper may change its advertised MPLS routes proactively based on, for example, scheduled engineering work. If a tunnel is expected to be affected by pre-planned work at over a specified time period, then the advertised route to the IGP will be changed beforehand so that any service that is admitted and transmitted through the MPLS network is not subjected to a sudden re-route when the failure actually happens (using FRR or similar resilience technology).

Referring to FIG. 3, an example of how to choose tunnels for a given service request, for example a request sent from a customer network router to the provider edge router of an MPLS network, will now be given. For example, if the network policy is to pack as many services into a portion of the network as possible, then the tunnels could be chosen in such a way that they share the same underlying infrastructure whilst being able to collectively support the bandwidth and QoS of the service request. Alternatively, if the network policy is to distribute services that request the same CoS over the same tunnel, then this can also be implemented by the gatekeeper. A further alternative is to choose multiple tunnels that support the same CoS and use a simple scheduling algorithm, such as a known hash function, to distribute the sessions across them.

The choice of tunnels depends firstly on its availability and this can be determined from the capability look up table. If a service is known to last for 90-minutes and is a video channel, which can be determined from predictions about content and user statistics, then a tunnel that is expected to carry traffic at a higher priority at a later time to a geographically closer destination might not be chosen for this session. Also, a tunnel that is expected to tear down during the session is unlikely to be chosen. Alternatively, if a DSCP value specifies end-to-end loss and delay values, the tunnel(s) might be chosen based on the predicted performance of the existing sessions on the tunnel(s) as well as the expected impact of the new session on the other services. This uses the MIB, OSPF LSA and content prediction data from the core predictive model. Any number of policies can be implemented based on: the operators preferences; the QoS expected by the incoming service; and the current and predicted network state. For each of these policies, different decision points from the original model will be used.

This provides a progression from a known static LSP to traffic trunk mapping to a more dynamic, predictive method of MPLS. This dynamic assignment of MPLS LSPs to service requests means that pre-configured LSPs can be kept alive using 'hello' messages even after all the data has traversed, so that it can be reused for another customer or another class of service at a later time.

Once a set of tunnels have been chosen, the relevant MPLS lookup tables, such as the Forwarding Information Base (FIB, used mainly by the PE routers) and Label Forwarding Information Base (LFIB, used by all core MPLS routers), are altered. The same LSP can be assigned to several traffic trunks as long as the cumulative bandwidths and QoS of the LSPs chosen meets the requirements of the ARQ. This is a challenging task and cannot be done manually or while first setting up the network.

In order to build an initial CLT, it is necessary to iterate over all available tunnels and generate entries for each tunnel T. The number of entries depends on the time granularity required for predictions by the decision making logic. Assuming that predictions of average performance of the network for each 5 minute slot over a 24 period are required then the decision logic will use predictive models that support this time granularity. As explained above, there are number of ways in which predictive models for relevant network parameters to predict performance, or traffic, for a particular time interval can be determined.

Assume that the CLT creation process is started at midnight. The process begins with tunnel T1 and first checks if there is a known end to the availability of T1, for example due to scheduled engineering works. This would then restrict the predictive horizon to less than 24 hours. Assuming that there is no end to the availability of T1 then the expected bandwidth and performance parameters required to decide on the class of service (e.g. jitter, RTT or delay, and loss) for each link that is part of T1 can be computed. The bandwidth of T1 will be the minimum bandwidth of its links. Jitter and delay will be computed as sums over the links and loss is the maximum loss over all links in T1. 288 predictions will be computed for each of the 5 minute periods comprising the 24 hour period of interest.

The first step in building the capability lookup table is to aggregate tunnel-level metrics, starting from link-level. For example, if jitter is used as one of the performance metrics, the tunnel jitter will be the sum of the component link jitter values. If throughput is a performance metric, the link with the least available throughput will be the bottleneck link that determines the tunnel's throughput. For more complex parameters such as rate of change of ECN markings on component routers with time, in-contract vs. out-of-contract traffic profiles, buffer occupancies, average values across each component router could be chosen as the tunnel-level metric. Alternatively, a weighting factor can be applied such that some routers or links are given more importance in the tunnel than others. In this example, we have only used jitter and throughput as the key performance metrics to determine congestion.

The next step after performance metrics prediction is to test for future predicted services through the tunnel being evaluated. The principles are the same as those used in session admission control. Note, however, that if Tunnel T1 comprises of a number of links, the content predictions for each of these links must be taken into account for the entire tunnel. For example, if L1 is predicted a 10 Mbps AF1 session 90 minutes from current time since it is also part of tunnel T2, and L2 is predicted another 15 Mbps session in 90 minutes time as part of another tunnel, then each of these throughputs will be taken into account for tunnel T1. This means that, in 90 minutes, tunnel T1 will have 10 Mbps less than its current throughput availability (using bandwidth bottleneck approach). As an extension, if other performance metrics are, used to evaluate the 'congestion' or 'availability' of the tunnel based on expected future content, each link must be aggregated to evaluate the impact on the tunnel. It is assumed for this example that there is no expected content in the future. A predicted session will, in general, decrease the availability in the capability lookup table.

The next step is to evaluate the impact of a given session on existing services. Since this CLT is built constantly in the background, irrespective of whether or not there is in fact a session requesting allocation, it is assumed that a dummy 'session' of the given bandwidth at the given class of service is to be assigned to the tunnel being evaluated. For example, in order to build the first entry in the lookup table for T1 below, a dummy session will be evaluated at EF class for a throughput of 10 Mbps. Alternatively, it is also possible to build the capability lookup table as and when the requests arrive in real-time. This means that the table will only be updated when a new session arrives and the request cannot be fulfilled by the existing table and a new tunnel assignment process must be triggered to evaluate all the steps described above. In evaluating the impact of allocating a session to a tunnel, we take into account the impact on each of the component routers and links, depending on the chosen performance metrics. This is similar to the link-to-tunnel translation described above. Once a tunnel-level aggregate is formed, models can be used to evaluate whether or not a dummy 'session' of the given SLA features will have an adverse effect on existing services.

The final step is to evaluate the predicted capability of a tunnel and its availability with historical evidence. Note that it is possible to skip any of these steps in building the CLT and perform the step when a session request arrives. For example, the CLT can be built based on performance predictions, network health, predicted future content, predicted impact on existing services but omit the validation against historical evidence. This validation can be performed when a tunnel is chosen from the table for a given request and then the validation against historical data is done in real-time before deciding to assign the tunnel to the current session requesting allocation/admission. Similarly, other steps in this decision process can be omitted in building the CLT and undertaken only when a real request arrives at a later time.

TABLE 2

Partial Initial Capability Lookup Table (CLT)

| Tunnel ID | Available from time | Available until time | Destination | Bandwidth (Mbps) | Class of Service |
|---|---|---|---|---|---|
| 1 | 0:00 | 7:45 | 10.144.x.x | 10 | EF |
| 1 | 0:00 | 7:45 | 10.144.x.x | 81 | AF |
| 1 | 7:45 | 14:30 | 10.144.x.x | 5 | EF |
| 1 | 7:45 | 14:30 | 10.144.x.x | 40.5 | AF |
| 1 | 14:30 | 19:25 | 10.144.x.x | 7 | EF |
| 1 | 14:30 | 19:25 | 10.144.x.x | 54 | AF |
| 1 | 19:25 | 0:00 | 10.144.x.x | 10 | EF |
| 1 | 19:25 | 0:00 | 10.144.x.x | 81 | AF |

Table 2 above shows a part of the initial CLT showing the capabilities associated with tunnel T1. After completing the computations for T1, they are iterated for tunnels T2, T3, etc. until we have exhausted the list of tunnels and the CLT is complete.

In the present example, it is assumed that the lookup table builder performs all the above tests before entering a record into the CLT. Depending on the outcomes of all the above tests, a decision is made as to which Classes of Service that can be supported for each time interval. A policy has been assumed that the remaining bandwidth is split with 10% being apportioned to EF and 90% for AF (assuming that these CoS are supported in the tunnel). In order to reduce the number of entries in the CLT consecutive rows of T1 are combined if they are identical in terms of bandwidth and CoS and "available until time" is amended accordingly. Table 2 shows that after the combination of the rows, there are four rows remaining for each class of service which roughly cover an early morning, midday, late afternoon/evening and night period.

In order to keep the CLT up to date, the tunnel details may be determined at regular time intervals, say every hour.

Alternatively, a re-computation of the CLT may be triggered when one or more tunnel states have changed or a new tunnel has been commissioned. Note that once a CLT is built, the gatekeeper also manages the timeout period of the tunnel and ensures that the tunnel does not expire when no traffic flows through it.

Figure 5:
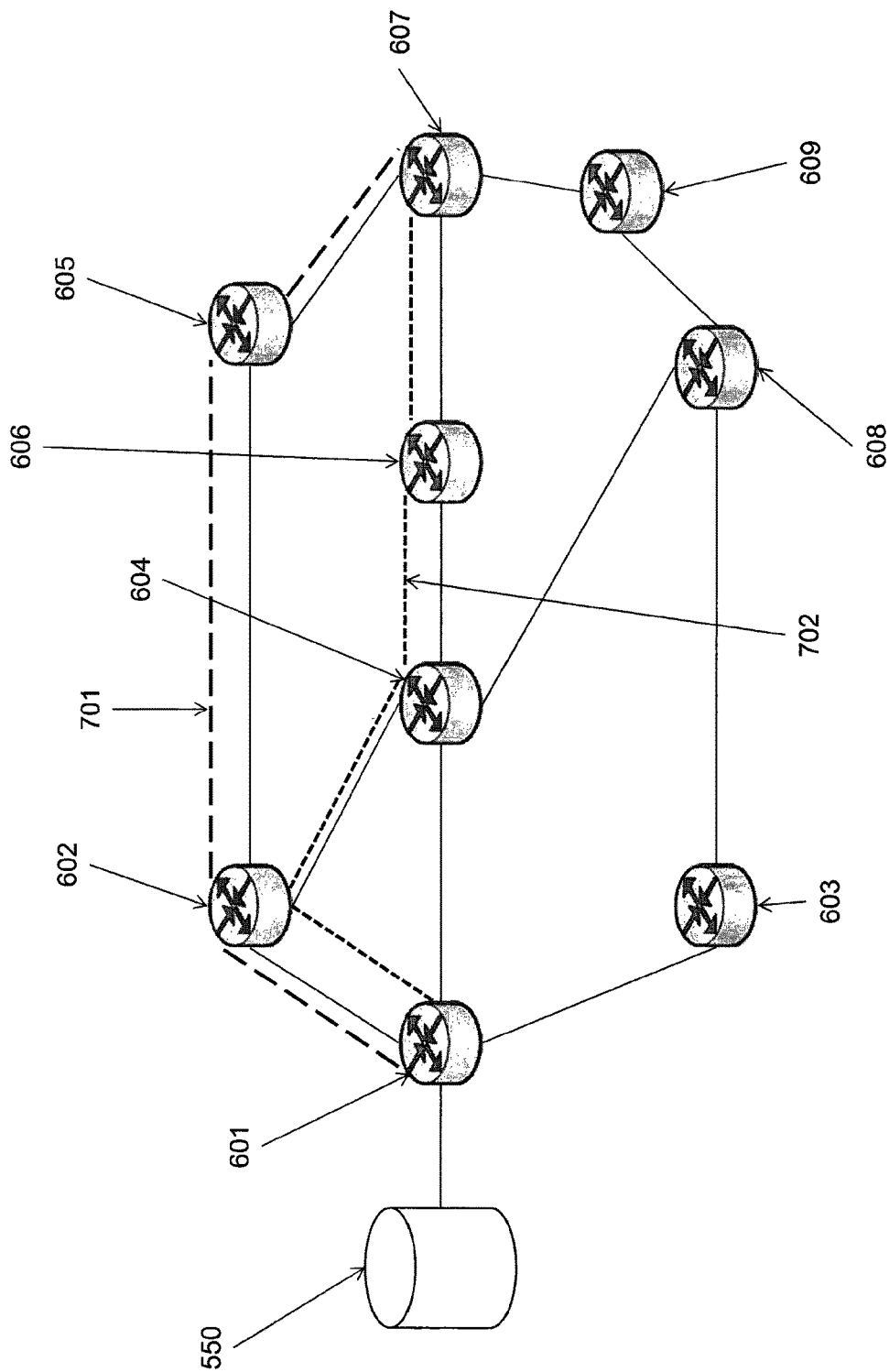
FIG. 5 shows a schematic depiction of tunnels in an MPLS networks comprising a gatekeeper and routers.

FIG. 5 shows a schematic depiction of an MPLS network which comprises gatekeeper 550 and routers R1 to R9 (reference numerals 601 to 609 respectively). One tunnel T1 701 (shown by the long dashes in FIG. 5) describes a route from router R1 (601) to R7 (607) via R2 (602) and R5 (605). A further tunnel T2 702 (shown by the short dashes in FIG. 5) describes a route from router R1 (601) to R7 (607) via intermediate routers R4 and R6 (604, 606).

Assume a session s0 (1 Mbps, AF4, source: R1, destination: R7, expected duration: 240 minutes) requests admission at the gatekeeper 550 into the network shown in FIG. 5. The existing sessions are 2 sessions at 2 Mbps each as AF3, both traversing though T1 and 1 session at 0.5 Mbps traversing through T2 as EF. Assume that OSPF is run as the internal IGP.

The process steps in deciding whether or not to admit this session are as follows:
1. Identification of weakest link in shortest path to destination
2. Calculate expected performance of chosen weakest link at time T+1
3. Evaluation of impact on other services and network
4. Evaluation against historical performance Each of these steps will now be explained below in greater detail.

Identification of weakest link in shortest path to destination

The IGP can be used to identify the shortest path that the routing protocol advises from R1 to R7. This information can be obtained from the routing tables in R1 (or from the gatekeeper function 550 itself) and is based on link costs for packets to travel from R1 to R7. This does not necessarily take into account traffic or congestion on the shortest path, which is some of the information we add through the next steps. Assume, for this example, that OSPF advises the first preferred shortest path to be through T1 (3 hops to destination). R1 has information in its routing tables about the hop-by-hop map pathway to R7 via T1 which is also accessible to the gatekeeper. From this, the gatekeeper can identify that pathway T1 comprises of links L1, L2 and L3 to destination R7. The next task is to identify the worst performing link. This can be done using any number of measures and a list of suitable parameters is given above. In this example, since s0 requests AF4 CoS, we will use packet loss and available data rate at each CoS as the measure to identify weakest link.

Assume that L1 suffers a packet loss for AF4 of 0.50%, L2 suffers a packet loss of 0.10% and L3 suffers from 0.40%, i.e. packet delivery rates are L1: 99.50%, L2: 99.90%, L3L 99.60%. Assume that the maximum port speeds on links are 100 Mbps each.

In this example, L1 has a loss of 0.5% and the current available data rate on the port for all classes of service is 100-4.5=95.5 Mbps. If we assume that EF has a contractual 10 Mbps allocation and AF has been assigned a data rate of maximum 90% of remaining port speed, this leaves a remaining data rate of 77 Mbps on L1 with a loss of 0.50% of packets. This makes L1 the weakest link, both on the basis of remaining available data rate as well as maximum data loss.

If, however, the network was such that L2 had a bottleneck in available data rate and L1 had the maximum loss among the 3 links in T1, a weighting function could be used to decide which trade off should be made. As an extension, it is possible to include several parameters to use when identifying the 'bottleneck' link. Different weighting factors and parameters can be used, depending on class of service and type of router (PE/P/CE router, for example). All these result in a generic function to identify the bottleneck link in the shortest path T1 for session s0. In this example L1 is identified as being the bottleneck link on the basis of the two parameters and the assumed metrics.

Evaluation of performance of bottleneck link at time t+1

There are 3 significant steps in this part of the session admission procedure. The first of these is to collect the static metrics for L1. The most important one could be PEWs on the link L1. Assume that L1 is scheduled to be available for the next 240 minutes. If a PEW had been scheduled (say, from 120 minutes from current time), then either the session admission algorithm returns to OSPF to pick the next shortest path (which might be through the lower half of the network) or rejects the session request. However, this is not an issue here since there are no PEWs on L1.

Other static parameters could be the threshold at which congestion avoidance/control techniques are triggered (e.g. WRED or Weighted Drop Tail), the maximum port speed from router MIBs for L1 and any policies in traffic distribution set by the operator. It is assumed that the network operator wishes to pack traffic to links such that maximum link utilization is made, rather than distributing traffic evenly across the network. In this example, it is also assumed that the WRED threshold has been taken into account such that this is already reflected in the current packet loss on L1 (0.50%) which is contributed to by WRED as well as packet discard issues.

The next step is to use these static parameters, as well as time-dependent metrics, to estimate the performance of L1 for the next 240 minutes, assuming this prediction can be made with sufficient accuracy. If a prediction can only be made for the next 60 minutes, the operator can either make a choice to go ahead if all the criteria are met for the next hour and risk having to suffer degradation subsequently or engage a predictive QoS degradation algorithm. Alternatively, the operator can choose to reject this route entirely and evaluate the next shortest path to the destination. It is assumed that the prediction can be made for the next 240 minutes with sufficient reliability.

There are two sets of time-dependent parameters: ones that relate to the service (both existing services and those that are expected to be received) and ones that relate to the network. Together, both sets of parameters can be used to generate a prediction of congestion, which can then be used as a performance indicator for link L1 at time t+1. Parameters that relate to the service include: the number of active sessions, in-profile and out-of-profile bandwidth utilization per service/CoS, rate of change of Explicit Congestion Notifications in each CoS, session round-trip time (RTT), session packet delivery rate, session latency and throughput per session (or service), etc. Network parameters include: router buffer occupancy (for all buffers or one a per Class of Service basis), reservable/unreserved bandwidth values on each interface as -sent by OSPF Type 10 LSAs and MIB metrics such as ipinReceives, ipinDiscards, ipOutDiscards. Using these parameters, a prediction of the performance of L1 at time t+1 (i.e. 240 minutes into the future) can be made. The preceding discussion describes how a predictive model can be built and used to make a prediction at 10 AM for one parameter, that is jitter, at 4 hourly instances between 1 PM to 5 PM later in the day. An extension of this is a predictive model, comprising of several parameters—network and service-related—to predict congestion in a similar time window. This is an algorithmic process and several learning algorithms can be used to create this function. One possible example of a list of input parameters for this function is:

Jitter, RTT, Packet Loss, Router Buffer Occupancy, and other MIB Metrics.

The specific parameters that will be used for this function depend on the network itself and also on the parameters that are being collected. The optimal set of parameters can be chosen using feature-selection algorithms. Using these parameters, the predictive model is built such that we know whether performance of the weakest link L1 will be acceptable against the SLA requirements of AF4.

In this example, it is assumed that the feature selection process has been performed and we know that for CoS AF4, packet loss and available throughput are used as metrics to predict performance 240 minutes from current time. Therefore, congestion on L1 at t+1=ƒ(packet loss at t, available throughput at t), where f is a function derived by a learning algorithm from training data as has been described previously.

The second set of parameters relates to the health of the network and existing services if there is no new content entering the network. The third set of parameters used to predict performance of L1 in the next 240 minutes is predictions of new incoming content. This includes predictions from the a centralised system. For example, assume that the operator knows that R2 acts as central node for an FTP transfer to a business network and that files are regularly transferred on L1 at 120 minute intervals. The next data transfer at a rate of 10 Mbps is to happen in 90 minutes time and this expected new content is carried as AF4 (policy dependent). This reduces the available throughput in 90 minutes for AF4 to (77−10)=67 Mbps.

It is assumed that R1 and R2 are not at capacity and that this new service does not affect the packet delivery rates (this can be calculated using a predictive model for packet delivery rate at time t+1, as described in above with respect to jitter). After 90 minutes, L1 has 67 Mbps available for the duration of the FTP session and a packet loss of 0.50%. it can be assumed that the other services through T1 and T2 remain the same and that each FTP session will last for 15 minutes.

The predicted new services can be more complex and can be received from other recommendation algorithms. Alternatively, it could be a set of rules passed from the operator based on contractual agreements. Irrespective of how this information is obtained, the task is to evaluate the forecasted performance (according to a set of performance metrics) for the duration of s0 (or as far as possible or acceptable for the application) and deciding whether or not the service can be accommodated. With the example criteria for future performance (predicted packet delivery rates and forecasted throughput for the 240 minutes), both the network health model and the predicted incoming services model show that L1 will be able to support the requirement of s0 in AF4. We move to the next step.

Evaluation of Impact on other Services and Network

The next step in the decision process is to take into account the impact of s0 on existing services. In the following discussion, the metrics that will be used are throughput support and packet delivery rates for the existing services. As an extension, it is possible that for a different class of service, the performance metrics and the predictive model for these metrics are different. The existing sessions are 2 sessions at 2 Mbps each as AF3, both traversing though T1 and 1 session at 0.5 Mbps traversing through T2 as EF. Both T1 and T2 share L1, which means all bandwidth allocations will have to be made from the interface capacity of L1.

Assume that as part of the predictions about the new incoming services, there is also an indication of the duration of the other three services which pass over L1. These predictions can either be made with algorithms, on the basis of contract agreements on in-profile traffic or based on customer behaviour and regional viewing statistics. Assume that these predictions indicate that the current services will not require any more resources for the duration of the sessions and also that the SLA remains the same. This means that as long as the requirements of the existing sessions can be met for the duration of the session, according to the performance metrics that are chosen, then s0 can be deemed not to impact existing services adversely.

From previous calculations, it is known that L1 will have 77 Mbps of bandwidth available for the next 90 minute period, followed by 67 Mbps available until the end of the session at 240 minutes. A predictive model, such as the one described above, can be used to predict the impact on packet delivery rates for existing services, in a 'what-if' analysis of admitting s0. Based on the result of whether or not the existing services will be able to maintain their SLA when s0 is admitted, we proceed to the next stage.

For this example, it is assumed that our predictive model indicates that packet delivery rates will not be affected below acceptable thresholds for existing services if s0 is admitted. This prediction could be based on abundant buffer availability in R1 and R2 such that increasing data throughput (from s0) does not increase the error rates. The model could take into account the software computation accuracy of the routers themselves and identify that unless data rates exceed well over link capacity, packet delivery rates will not be affected. From this analysis, it can be determined that the admission of s0 does not adversely impact existing services through L1.

Note that all the above tasks can be combined into a single function:

$$\text{Session admission} = f(A, B, C, \ldots D)$$

where A and B could be future performance/congestion prediction based on performance metric prediction models, C is a function of expected services for the duration of s0 and D is a function of the impact of s0 on existing services.

Evaluation against Historical Performance

This aspect of the admission decision is to decide whether or not the admission decision has been valid in the past. This takes into account the accuracy of all the predictions to decide if a similar decision for a similar session s0 during a similar network state in the past has been successful and s0 had, in fact, been supported to AF4 requirements.

This comparison can be made using rule mining. Decisions that are made are logged as historical data. Information that could be included comprises: current and predicted performance metric values (i.e. current network state); expected content for duration of session; and the decision made of whether or not to admit the new service s0. Following this, data about the performance of the network and existing services (which now includes s0) is collected as part of the learning process for the next session admission decision. Lists of the metrics that are collected over time are mentioned in the preceding discussion. A collection of one set of these metrics will form a record in the historical database.

In order to build a model for session admission the historical data is analysed and its statistics are evaluated. For a new session request and the current network state it is necessary to find the identical or similar records in the historic database and compute the chance of success. As numerical data is being analysed it may be that there are no, or few, identical records in the historical database. One way to solve this problem is to discretise the data by binning, e.g. for the remaining bandwidth we can use 10 Mb/s wide intervals. Alternatively, a similarity measure may be used by interpreting the records as numerical vectors, normalising them and computing the distance between a historical record and the current request & network's state which yields a number between 0 and 1. Using 1-distance as the similarity measure then a threshold can be selected, e.g. 0.9, to accept a historical record as similar enough to the current request in order to include it into the computation for chance of success. If the chance of success is high enough, e.g. 50%, then the decision logic can make the decision to admit.

In the case of the request s0 and assuming that: data has been discretised by binning; five similar instances have been found in the historical data and that the success rate has been 3 out of 5. As in 60% of the cases when a session similar to s0 was admitted into a similar network in the past the network was able to meet the QoS requirements of AF4 and there was no adverse impact on the existing services. S0 has now passed all admission control tests at the gatekeeper and therefore it will be to admitted into the network.

After a session has been admitted to the network, it will be necessary to select a tunnel for routing the data through the network. Assume the CLT is as shown below in FIG. 3 and that the following service requests S1 & S2 are received:
S1=(3:00, 6:00, 10.144.10.44, 200, AF1),
S2=(4:00, 5:00, 10.144.11.55, 300, AF2)
where the incoming service requests provide start and end time, destination address, required bandwidth and class of service.

TABLE 3

Capability look-up table (CLT) before S1 is granted

| Tunnel ID | Available from time | Available until time | Destination | Bandwidth (kbps) | Class of Service |
|---|---|---|---|---|---|
| 1 | 0:00 | 3:00 | 10.144.x.x | 500 | EF |
| 2 | 0:00 | 7:50 | 10.233.x.x | 1000 | EF |
| 3 | 3:00 | 6:00 | 10.144.x.x | 250 | AF1 |
| 4 | 4:50 | 14:00 | 10.166.x.x | 500 | DE |
| 5 | 1:00 | 6:00 | 10.144.x.x | 250 | AF2 |

It can be seen from Table 3 that the entry on row 3 has the necessary characteristics for request S1 and once request S1 has been granted then the CLT will be updated accordingly to show the decrease in available bandwidth.

TABLE 4

Capability look-up table (CLT) after S1 has been granted

| Tunnel ID | Available from time | Available until time | Destination | Bandwidth (kbps) | Class of Service |
|---|---|---|---|---|---|
| 1 | 0:00 | 3:00 | 10.144.x.x | 500 | EF |
| 2 | 0:00 | 7:50 | 10.233.x.x | 1000 | EF |
| 3 | 3:00 | 6:00 | 10.144.x.x | 50 | AF1 |
| 4 | 4:50 | 14:00 | 10.166.x.x | 500 | DE |
| 5 | 1:00 | 6:00 | 10.144.x.x | 250 | AF2 |

When request S2 is received, a matching row is not present in the CLT. Therefore a new reservation has to be made in one, of the available tunnels using the session admission decision process applied at tunnel level, followed by RSVP TE (or similar) to implement the reservation. Assume that the reservation process identified Tunnel 6 that has 500 kbps available bandwidth and can accommodate the request. A new row is added to the table and the remaining available bandwidth of 300 kbps is recorded.

TABLE 5

Capability look-up table (CLT) after S2 has been granted

| Tunnel ID | Available from time | Available until time | Destination | Bandwidth (kbps) | Class of Service |
|---|---|---|---|---|---|
| 1 | 0:00 | 3:00 | 10.144.x.x | 500 | EF |
| 2 | 0:00 | 7:50 | 10.233.x.x | 1000 | EF |
| 3 | 3:00 | 6:00 | 10.144.x.x | 50 | AF1 |
| 4 | 4:50 | 14:00 | 10.166.x.x | 500 | DE |
| 5 | 1:00 | 6:00 | 10.144.x.x | 250 | AF2 |
| 6 | 3:30 | 10:00 | 10.144.x.x | 300 | AF2 |

In some situations it will not be possible for a session to be admitted across a single tunnel. Rather than rejecting the request, it is possible for the requirements of the session to be met by load balancing the request over a plurality of tunnels.

Figure 6:
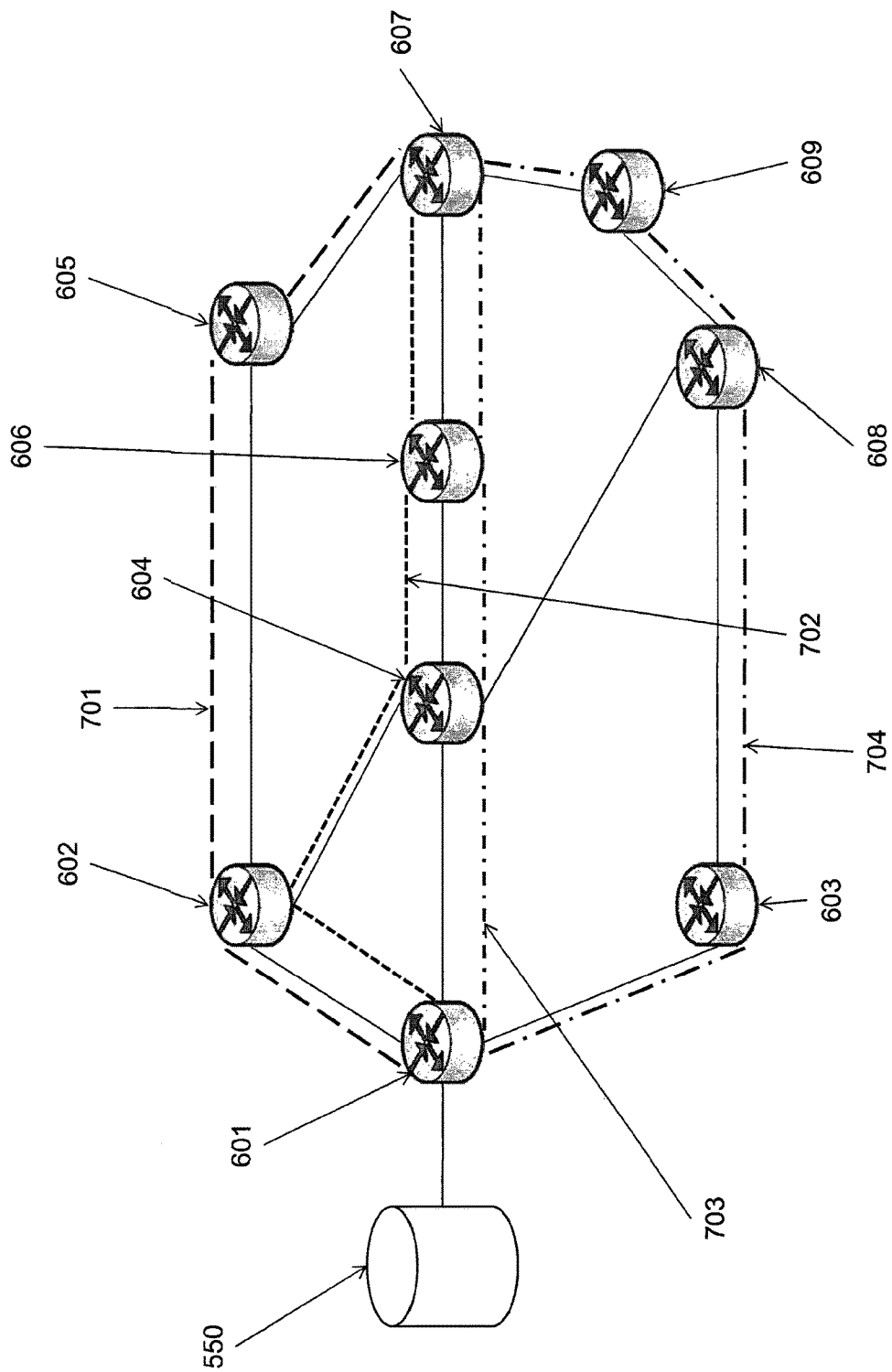
FIG. 6 shows a schematic depiction of a further network which is operated in accordance with an example embodiment of the present invention.

FIG. 6 shows a schematic depiction of a further network which is operated in accordance with a method according to the present invention. The network is similar to the network shown in FIG. 5 with the exception that the network supports two further tunnels. Tunnel T3 703 connects router R1 to router R7 via routers R4 & R6 and tunnel T4 connects router R1 to router R7 via routers R3, R8 & R9. For the purpose of the following discussion tunnel T2 is not used and tunnel T4 is initially not active. Table 6 shows the CLT for the active tunnels T1 & T3.

TABLE 6

Capability Look-up Table for Tunnels 1 & 3.

| Tunnel ID | Available from time | Available until time | Destination | Bandwidth (Mbps) | Class of Service |
|---|---|---|---|---|---|
| 1 | 0:00 | 11:30 | R7 | 77 | AF |
| 1 | 11:30 | 11:45 | R7 | 67 | AF |
| 1 | 11:45 | 14:00 | R7 | 77 | AF |
| 1 | 0:00 | 09:00 | R7 | 9.5 | EF |
| 1 | 09:00 | 14:00 | R7 | 1.5 | EF |
| 3 | 0:00 | 14:00 | R7 | 5 | EF |
| 3 | 0:00 | 14:00 | R7 | 50 | AF |

Assume that a greedy assignment policy is operated, such that where a tunnel which has the greatest availability for a given CoS will be assigned the biggest portion of the service flows to be allocated for that CoS. It is also assumed that the session in this example to be load balanced is non-TCP and has permissions to be split in multipath to the same destination. The same example can be applied to apportioning a number of sessions to a number of tunnels, based on the same decision process.

Load balancing can be performed for several reasons. For example, sessions X and Y can be apportioned on tunnels T1 and T3 based on throughput availability considerations. Alternatively, load balancing can be done based on the confidence of impact prediction on other services, i.e. based on likely QoS rather than throughput. For example, assume that when calculating impact on other services, it is found that a new session X is likely to adversely impact another session carried at EF with a 40% confidence level. This risk could be deemed too high and session X could be assigned to another tunnel. Another policy could be to minimise the number of changes in service-to-tunnel mapping. This means that even if a given tunnel T1 can support session X for a proportion of the expected session duration, after which a new route must be found, load balancing over T1 and T3 may be used to prevent this handover entirely. Since the underlying method of load balancing is based on more than simple shortest path calculations or pre-defined tunnel mappings, taking into account all the factors described above, this approach offers advantage over known load balancing methodologies.

Assume that a session s4 requests admission to the network at 08:30. Details of s4: ingress at R1, egress at R7, expected duration of 60 minutes, bandwidth requested: 6 Mbps at CoS EF. If the simple admission control and tunnel mapping methods described above were to be used then the session would not be admitted into the network.

The gatekeeper first iterates over the current CLT to determine if a single tunnel can satisfy the allocation request. As a CLT has been generated then it can be assumed that the required decision process of predicting future performance of the component links, forecasted future services through the network, predicted impact of assigning the new service to the given tunnel on existing services and validation of predictions against historical performance in a similar state, has already been performed. Given this information, the gatekeeper concludes that s4 cannot be assigned to T1 or T3 in its entirety without degradation or possibly even session drop at 09:00. Since this is unacceptable for EF traffic, load balancing must now be triggered or the session request be rejected.

The gatekeeper will use a greedy approach to assign service flows to tunnels. This is where other policies can be implemented in deciding which tunnels are allocated flows first. Although this example has been, this policy-based trade-off between QoS and throughput is not trivial.

The CLT indicates that there will be only 1.5 Mbps available on tunnel T1 to assign to a new service flow after 09:00. Assuming that the router's buffer queues in T1 accept full occupancy, the gatekeeper uses this information to assign 1.5 Mbps of the 6 Mbps from s4 to T1, followed by the remaining 4.5 Mbps to T2, both at EF class.

In an alternative scenario consider that tunnel T4 has been activated and the CLT is now as shown below in Table 7.

TABLE 6

Capability Look-up Table for Tunnels 1, 3 & 4.

| Tunnel ID | Available from time | Available until time | Destination | Bandwidth (Mbps) | Class of Service |
|---|---|---|---|---|---|
| 1 | 0:00 | 11:30 | R7 | 77 | AF |
| 1 | 11:30 | 11:45 | R7 | 67 | AF |
| 1 | 11:45 | 14:00 | R7 | 77 | AF |
| 1 | 0:00 | 09:00 | R7 | 9.5 | EF |
| 1 | 09:00 | 14:00 | R7 | 1.5 | EF |
| 3 | 0:00 | 14:00 | R7 | 5 | EF |
| 3 | 0:00 | 14:00 | R7 | 50 | AF |
| 4 | 0:00 | 14:00 | R7 | 5 | EF |

In such a case, a weighting factor can be assigned to the various steps in the decision process behind building the CLT. For example, although T3 and T4 offer exactly the same capability (according to Table 7), if it is predicted that the there is a greater likelihood of a new service having an impact on existing services on T4 than on T4 then a greater weighting might be applied, rendering T4 at a disadvantage. This might result in T3 taking 4.5 Mbps of the 6 Mbps of s4, instead of distributing the bandwidth evenly over both T3 and T4.

Alternatively, if we wish to avoid an infrastructure failure due to overloading, or the confidence of our evaluation of expected impact on existing services through T1 is higher than a set threshold for this class of service, we might choose not to assign 1.5 Mbps to T1 and apportion s4 entirely across T3 and T4 These are all more complex situations of load balancing, among others, where the basic principle is to alter the weighting factors of each of the stages in the CLT building process based on the application, class of service requested, current network state and network health, and operator policies.

Note that if the destination is R6, instead of R7, the gatekeeper can choose to use MPLS to this destination using T3, but R6 will decapsulate the packets, recognising that they have reached their destination IP address.

The preceding example is based on the session request specifying the EF Class of Service. However, if s4 requested for DE traffic and the same throughput is available for this CoS as well, the gatekeeper might allow this traffic over T1 even though at 09:00 the network state will result in QoS degradation. At this point, if the gatekeeper wishes to provide a better service, the session can be re-routed through T3 using other methods. It will be understood that such an approach would be unacceptable for EF traffic.

What is claimed is:

1. A method of operating a communications network, the network comprising a plurality of nodes, a plurality of communications links interconnecting the nodes and a plurality of tunnels, each of the plurality of tunnels comprising one or more of the plurality of communications links
the method comprising the steps of:
a) creating a datastore, the datastore comprising, for each of the plurality of tunnels connecting a first network node to a second network node, one or more parameter values for a plurality of time intervals over a predetermined duration;
b) receiving a request to admit a session to the communications network, the session being routed between the first network node and the second network node;
for each of the plurality of tunnels connecting a first network node to a second network node:
i) determining the expected performance of the tunnel for the duration of the requested session;
ii) determining the impact of admitting the requested session to the sessions already supported by the tunnel; and
iii) evaluating the historical performance of the tunnel;
and accepting the request to admit a session to one of the plurality of tunnels if the admitted session can be supported by the tunnel throughout the duration of the session without impacting presently supported sessions.

2. A method according to claim 1, comprising the further step of updating the datastore in response to the acceptance of the request to admit a session.

3. A method according to claim 1, wherein in step a) the datastore is created on the basis of parameter values of the plurality of communications links which comprise the plurality of tunnels.

4. A method according to claim 1, wherein in step i) the expected performance of the tunnel for the duration of the requested session is determined on the basis of one of the communications links which comprise the tunnel.

5. A method according to claim 4, wherein the expected performance of the tunnel for the duration of the requested session is determined on the basis of the communications links which is most likely to fail in the event that the session is admitted.

6. A method according to claim 1, wherein if the requested session cannot be admitted by the network, the method comprising the further steps of:
determining a first portion of the requested session to be admitted over a first tunnel connecting a first network node to a second network node;
determining one or more further portions to be admitted over one or more further tunnels connecting a first network node to a second network node, the admission of each of the portions of the session request to be determined in accordance with steps i), ii) & iii).

7. The method according to claim 1, wherein an admission decision to accept the request to admit the session to said one of the plurality of tunnels is determined based on the determined impact of admitting the requested session to the sessions already supported by the tunnel and the evaluation of the historical performance of the tunnel, the evaluation of the historical performance of the tunnel including a decision of whether or not the admission decision has been valid in the past.

8. The method according to claim 1, wherein an admission decision to accept the request to admit the session to said one of the plurality of tunnels is determined based on the determined impact of admitting the requested session to the sessions already supported by the tunnel and the evaluation of the historical performance of the tunnel, the evaluation of the historical performance of the tunnel including a decision of whether or not the admission decision or similar admission decision has been valid in the past.

9. The method according to claim 1, wherein
the impact of admitting the requested session to the sessions already supported by the tunnel is determined based on the expected performance of the tunnel for the duration of the requested session;
the evaluation of the historical performance of the tunnel includes checking if the expected performance of the tunnel has occurred a previous time; and
an admission decision to accept the request to admit the session to said one of the plurality of tunnels is determined based on the determined impact of admitting the requested session to the sessions already supported by the tunnel and the evaluation of the historical performance of the tunnel.

10. The method according to claim 1, the method further comprising:
identifying one of the tunnels as a weakest link in a shortest path;
determining the expected performance includes calculation of expected performance for the weakest link;
determining the impact of admitting the requested session to the sessions already supported includes calculation of expected performance of the weakest link if the request session is admitted; and
evaluating the historical performance including evaluating whether the weakest link has performed as expected in a previous time; wherein
an admission decision to accept the request to admit the session is determined based on the determined impact of admitting the requested session to the sessions already supported by the tunnel and the evaluation of the historical performance of the weakest link.

11. The method according to claim 1, wherein
determining the impact of admitting the requested session to the sessions already supported by the tunnel in ii) includes determining whether or not existing services will be able to maintain their service level agreements, and if so, proceeding to iii); and
evaluating the historical performance in iii) takes into account accuracy of predictions to decide if a similar decision for a similar session request has been successful; and
an admission decision to accept the request to admit the session to said one of the plurality of tunnels is determined based on the determined impact of ii) and the evaluation of the historical performance in iii).

12. A network gatekeeper for a network comprising a plurality of nodes, a plurality of communications links interconnecting the nodes and a plurality of tunnels, each of the plurality of tunnels comprising one or more of the plurality of communications links, the gatekeeper being a computer which is configured, in use, to:
a) create a datastore, the datastore comprising, for each of the plurality of tunnels connecting a first network node to a second network node, one or more parameter values for a plurality of time intervals over a predetermined duration;
b) receive a request to admit a session to the communications network, the session being routed between the first network node and the second network node;
and, for each of the plurality of tunnels connecting a first network node to a second network node, to:
i) determine the expected performance of the tunnel for the duration of the requested session;
ii) determine the impact of admitting the requested session to the sessions already supported by the tunnel; and
iii) evaluate the historical performance of the tunnel; and
accept the request to admit a session to one of the plurality of tunnels if the admitted session can be supported by the tunnel throughout the duration of the session without impacting presently supported sessions.

13. A network gatekeeper according to claim 12, the gatekeeper being further configure to, if the requested session cannot be admitted by the network:
determine a first portion of the requested session to be admitted over a first tunnel connecting a first network node to a second network node;
determine one or more further portions to be admitted over one or more further tunnels connecting a first network node to a second network node, the admission of each of the portions of the session request to be determined in accordance with steps i), ii) & iii).

14. The network gatekeeper according to claim 12, wherein an admission decision to accept the request to admit the session to said one of the plurality of tunnels is determined based on the determined impact of admitting the requested session to the sessions already supported by the tunnel and the evaluation of the historical performance of the tunnel, the evaluation of the historical performance of the tunnel including a decision of whether or not the admission decision has been valid in the past.

15. The network gatekeeper according to claim 12, wherein an admission decision to accept the request to admit the session to said one of the plurality of tunnels is determined based on the determined impact of admitting the requested session to the sessions already supported by the tunnel and the evaluation of the historical performance of the tunnel, the evaluation of the historical performance of the tunnel including a decision of whether or not the admission decision or similar admission decision has been valid in the past.

16. The network gatekeeper according to claim 12, wherein the impact of admitting the requested session to the sessions already supported by the tunnel is determined based on the expected performance of the tunnel for the duration of the requested session;

the evaluation of the historical performance of the tunnel includes checking if the expected performance of the tunnel has occurred a previous time; and an admission decision to accept the request to admit the session to said one of the plurality of tunnels is determined based on the determined impact of admitting the requested session to the sessions already supported by the tunnel and the evaluation of the historical performance of the tunnel.

17. The network gatekeeper according to claim 12, the gatekeeper is further configured to:

identify one of the tunnels as a weakest link in a shortest path; wherein:

determine the expected performance includes calculation of expected performance for the weakest link;

determine the impact of admitting the requested session to the sessions already supported includes calculation of expected performance of the weakest link if the request session is admitted;

evaluate the historical performance including evaluating whether the weakest link has performed as expected in a previous time; and an admission decision to accept the request to admit the session is determined based on the determined impact of admitting the requested session to the sessions already supported by the tunnel and the evaluation of the historical performance of the weakest link.

18. The network gatekeeper according to claim 12, wherein determining the impact of admitting the requested session to the sessions already supported by the tunnel in ii) includes determining whether or not existing services will be able to maintain their service level agreements, and if so, proceeding to iii); and evaluating the historical performance takes into account accuracy of predictions to decide if a similar decision for a similar session request has been successful; and an admission decision to accept the request to admit the session to said one of the plurality of tunnels is determined based on the determined impact in ii) and the evaluation of the historical performance in iii).

* * * * *